United States Patent [19]

Kondo

[11] Patent Number: 4,838,513
[45] Date of Patent: Jun. 13, 1989

[54] LOCK MECHANISM

[75] Inventor: Toru Kondo, Ayase, Japan

[73] Assignee: Ikeda Bussan Co., Ltd., Ayase, Japan

[21] Appl. No.: 77,143

[22] Filed: Jul. 21, 1987

[30] Foreign Application Priority Data

Jul. 22, 1986 [JP] Japan .................. 61-112201[U]

[51] Int. Cl.⁴ .............................................. B60N 1/02
[52] U.S. Cl. ...................... 248/503.1; 297/379
[58] Field of Search ................ 248/503.1, 503;
297/379; 292/DIG. 38, 216

[56] References Cited

U.S. PATENT DOCUMENTS 3,212,803 10/1965 Russell et al. .......... 292/DIG. 30 X
4,639,040  1/1987 Fujita et al. .................. 297/379
4,640,545  2/1987 Von Wimmersperg ........ 297/379 X

FOREIGN PATENT DOCUMENTS 54-63703 5/1979 Japan .

Primary Examiner—Alvin C. Chin-Shue
Attorney, Agent, or Firm—Foley & Lardner, Schwartz, Jeffery, Schwaab, Mack, Blumenthal & Evans

[57] ABSTRACT

A lock mechanism comprising a hook having a claw portion engageable with the front portion of a striker on a fixing member, said hook being urged in a direction in which its claw portion is engaged with the striker, and swingably supported by a rod arranged at the side of a member to be fixed; and a resilient bumper facing the inner side of the hook claw portion to hold the front portion of the striker between them, wherein said bumper is shaped substantially like a disc and freely rotatably supported by the rod by which the hook is also supported.

2 Claims, 1 Drawing Sheet

FIG. I
(PRIOR ART)
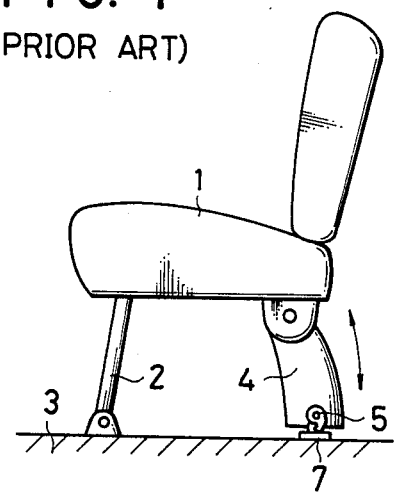
FIG. 2
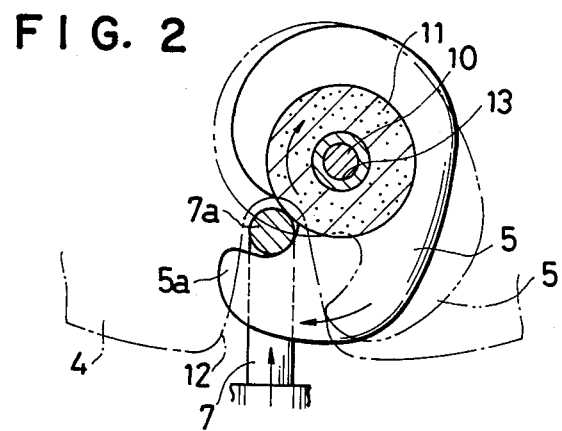
FIG. 3
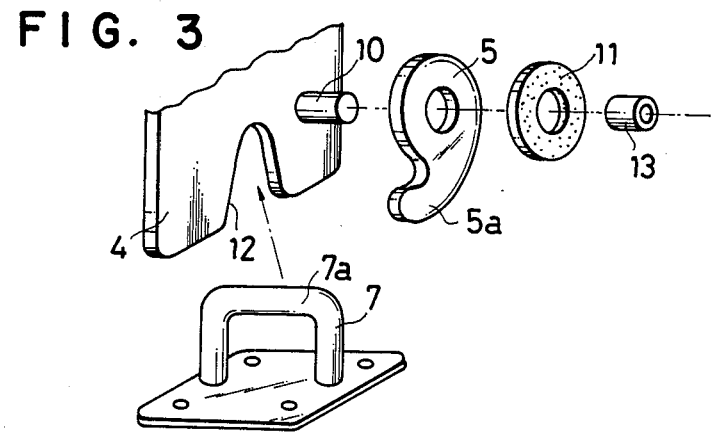

LOCK MECHANISM

BACKGROUND OF THE INVENTION

1. Field of the Invention

The present invention relates to an improvement of the lock mechanism suitable for fixing a matter such as the collapsible seat to the fixing object.

2. Prior Art

In the case of the collapsible seat 1 which is used as the seat for vehicles, for example, two legs 2 are pivoted on a floor 3 and the remaining two legs 4 each having a lock mechanism consisting of a hook 5 and a bumper are detachably attached and fixed to the floor 3 in such a way that the lock mechanism are engaged with strikers 7 on the floor 3, as shown in FIG. 1.

This lock mechanism is also used as the means for fixing seat backs, as disclosed by a pre-opened Japanese Utility Model Sho-54/63703 or the like.

In the case of the above-mentioned conventional lock mechanism, however, the front end of the striker attached to the fixing member is struck against the bumper when the claw portion of the hook is temporarily retreated, and it is then held and fixed between the bumper and the claw of the hook. When the front end of the striker is engaged with and released from the lock mechanism like this, therefore, it is slidably contacted with the bumper, thereby causing large operation resistance because of friction. This needs substantially large operation force to achieve locking and unlocking. In addition, the bumper is worn and the lock mechanism becomes thus unsteady as time goes by, thereby causing a problem in durability.

SUMMARY OF THE INVENTION

An object of the present invention is to provide a lock mechanism relatively simpler in construction and more excellent in handling.

Another object of the present invention is to provide a lock mechanism capable of reducing in maximum the wearing of those portions of the striker and the hook which are struck against each other even when impact is repeated between the striker and the hook.

These objects of the present invention can be achieved by a lock mechanism comprising a hook swingably supported by a rod of a member to be fixed and having a claw portion engaged with the front portion of a striker on a fixing member; and a resilient bumper facing the inner side of the claw portion of the hook to hold the front portion of the striker between them, wherein the bumper is shaped like a disc and freely rotatably supported by the rod by which the hook is also supported.

According to a lock mechanism of the present invention, its bumper which is struck against the front portion of the striker when it is engaged with and released from the striker can be rotated to reduce the operation resistance, thereby enabling the friction between them to be reduced. In addition, it can be made simpler and cheaper accordingly. Further, its handling can be made more excellent and its bumper and others can be prevented from wearing to enhance its durability.

BRIEF DESCRIPTION OF THE DRAWING

FIG. 1 shows the collapsible seat to which the conventional lock mechanism is applied.

FIG. 2 is a side view showing an example of the lock mechanism according to the present invention.

FIG. 3 is a perspective view showing the lock mechanism of the present invention developed at the main portion thereof.

DETAILED DESCRIPTION OF THE PREFERRED EMBODIMENT

An embodiment of the present invention will be described in detail with reference to the accompanying drawings.

An embodiment of the present invention will be described in detail with reference to the accompanying drawings.

FIGS. 2 and 3 show an example of the lock mechanism according to the present invention, which is applied to the collapsible seat shown in FIG. 1. Therefore, same parts as those shown in FIG. 1 will be represented by same numerals and description on these parts will be omitted.

According to the present invention, a lock mechanism comprises a hook 5 having a claw portion 5a engageable with a front portion 7a of a striker on a floor which serves as the fixing member, said hook 5 being urged by a means (not shown) in a direction in which its claw portion 5a is engaged with the front portion 7a of the striker 7, and swingably supported by a rod 10 arranged at the side of a seat leg 4; and a resilient bumper 11 facing the inner side of the claw portion 5a of the hook 5 to hold the front portion 7a of the striker 7 between them, wherein said bumper 11 is shaped substantially like a disc and freely rotatably supported by the rod 10 by which the hook 5 is also supported. Numeral 12 represents a lock groove which is formed by cutting away the seat leg 4 and into which the front portion 7a of the striker 7 is inserted, and 13 a collar for freely rotatably supporting the bumper 11 on the rod 10.

When the lock mechanism is arranged like this, its bumper 11 which is struck against the front portion 7a of the striker 7 when it is engaged with and released from the striker 7 can be rotated on the rod 10 to reduce the operation resistance and friction between the bumper 11 and the striker 7. This makes it unnecessary to use large handling force and the lock mechanism can be thus handled more easily at the time when it is locked and unlocked. Further, that portion of the bumper 11 which is contacted with the front portion 7a of the striker 7 is not always the same due to the rotation of the bumper and the bumper 11 can be less worn accordingly, thereby enhancing the durability of the lock mechanism.

According to the lock mechanism having the above-described arrangement, it is not needed that the bumper is attached to a portion which is different from that portion to which the hook 5 is attached, as often seen in the case of the conventional lock mechanism. More specifically, it is not needed that a part to which the bumper is attached and a means for attaching the bumper are provided independently of those for the hook 5. The effect of applying the lock mechanisms of the present invention to the seat legs 4 is therefore high.

It should be understood that the present invention is not limited to the above-described embodiment but various changes and modifications can be made relative to parts shape and construction, for example. It should also be understood that the present invention can be effective in fixing various matters in various fields.

Although a preferred embodiment of the present invention has been described, it should be understood that various changes and modification can be made without departing from the spirit and scope of the present invention.

I claim:

1. A lock mechanism for locking a fixing member to a movable member, comprising:

said striker erected from a fixing member;

a rod attached to a certain portion of a movable member, said movable member being engageable with the fixing member;

a hook swingably supported by the rod, said hook having a claw portion engageable with the striker along an inner surface of said claw portion;

a substantially disk-shaped, resilient bumper having an outer periphery facing an inner surface of said claw portion to hold a front portion of the striker between said outer periphery of said resilient bumper and said inner surface of the claw portion, when said claw is engaged with said striker;

said resilient bumper being freely, rotatably, mounted on said rod supporting said hook, and thereby rotatably displaced upon engagement with said front portion of said striker.

2. A lock mechanism according to claim 1 wherein a collar coaxial with said rod is interposed between the rod and each of the hook and bumper.

* * * * *